_United States Patent Office_

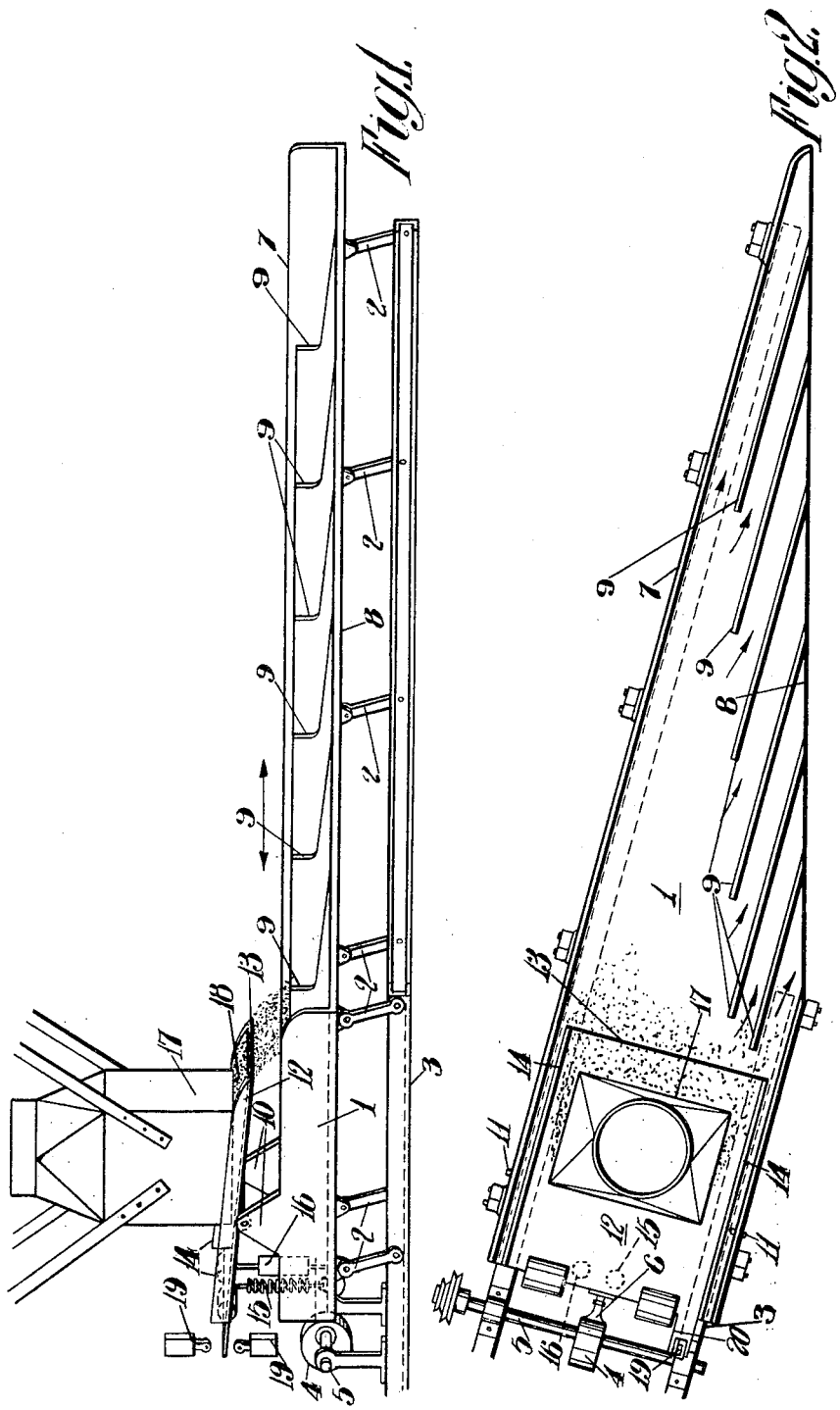

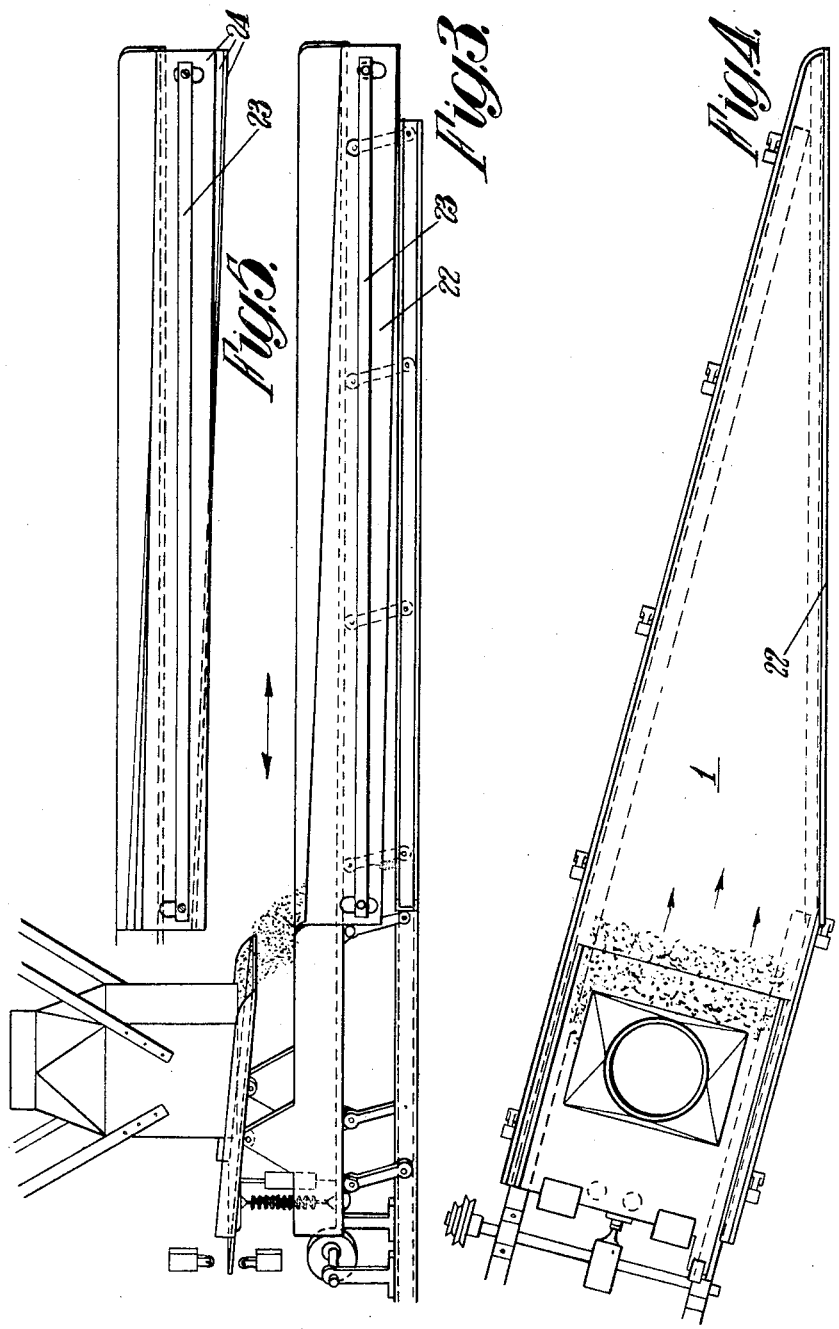

3,028,053
Patented Apr. 3, 1962

3,028,053
VIBRATING SPREADER FEEDERS FOR GRANULAR OR PARTICULATE MATERIALS
Thomas J. A. Brown, Buxton, Frederick Spencer, Cheadle Heath, Stockport, and Gerard Grady, Northenden, Manchester, England, assignors to Henry Simon Limited, Cheadle Heath, Stockport, Cheshire, England, a British company
Filed Feb. 6, 1959, Ser. No. 791,707
Claims priority, application Great Britain Feb. 10, 1958
5 Claims. (Cl. 222—161)

This invention relates to vibrating feeders of a kind used for spreading a stream of granular or particulate materials so that the said materials are fed therefrom in a wide curtain, and in particular to the type of such feeder to which materials are delivered by a spout or relatively narrow duct, and which has a relatively long, narrow, tapered vibrating spreader tray with one long side (which may be lipped to prevent spillage) parallel to the direction of travel of the material as it is impelled along the tray by the vibratory motion thereof, the other long side being cut on a bias with the direction of material travel to form a discharge edge from which the said material is fed in a wide curtain.

It is a disadvantage of conventional forms of such feeders that where the quantity of material to be fed is such that it passes along the tray in a layer of more than one particle thickness, uniformity in the thickness of the wide curtain fed from the biased edge of the tray is subject both to the amount of lateral spreading which occurs in the layer as a result of sideways displacement of particles, and to the flatness of the layer surface; this latter being dependent on the regularity of the input feed and the possibility of surges or pulsations therein which could cause a wave form in the layer surface.

The object of the present invention is to overcome these disadvantages.

According to the invention a vibrating spreader feeder comprises a relatively long narrow tapered spreader tray feeding element having a discharge edge cut on a bias, control means to control the discharge from said edge of material in a substantially uniform curtain, and a supporting framework complete with members for carrying the spreader tray feeding element and driving means to produce a reciprocatory motion therein.

The spreader feeder may also comprise intake feed regulating means which are automatically self-adjusting so that incoming materials are fed to the spreader tray feeding element at a rate substantially equal to the average intake rate without creating local irregularities in the surface of the layer formed by the said materials in the passing along the tray, such intake feed regulating means being free from static lodgements whereon illabile materials could build up to form permanent restrictions to the flow of material.

The control means may comprise a plurality of longitudinal substantially vertical guide vanes provided on the spreader tray and arranged parallel to the direction of reciprocatory motion, so that the approach to the discharge edge is through a plurality of comparatively narrow channels.

The control means may alternatively comprise a weir-plate mounted along the discharge edge, and forming a stock guide and discharge lip, the top edge of which is tapered downwardly from the feed end of the discharge portion of the tray so that its height above the tray surface approaches zero towards the remote end.

Referring to the accompanying drawings:

FIGURES 1 and 2 are elevation and plan views respectively of one embodiment of the invention, utilizing guide-vanes, FIGURES 3 and 4 are elevation and plan views respectively of another embodiment utilising a weir-plate, FIGURE 5 shows a modification of FIGURE 4 in which a multiple weir-plate is used.

The embodiment shown in FIGURES 1 and 2 comprises a narrow tapered spreader tray 1 supported by pivot arms 2 about a base frame 3. Reciprocatory motion is imparted to the tray 1 by means of an eccentric cam 4 which is carried on a rotatable shaft 5 and which engages a cam follower 6 carried at the rear end of the tray 1.

The tapered spreader tray 1 is relatively long in the direction of motion and has one long side (incorporating a full-length spillage-preventing lip 7) substantially parallel to the direction of reciprocatory motion. The discharge edge 8 of the tray is inclined across the direction of motion towards and terminating at the parallel long side, and the material-supporting surface of the tray is provided with a plurality of longitudinal and substantially vertical guide-vanes 9 which are parallel to the spillage-preventing lip 7 but in echelon along the discharge edge 8 of the tray the guide-vanes 9 being arranged so that the approach to the discharge edge 8 is through a plurality of comparatively narrow channels the guide-vane walls of which, in conjunction with the spillage-preventing lip, stopping any sideways spreading of a layer of material on the tray except where the channels are crossed by the tray discharge edge 8. The upper edges of the guide-vanes 9 are shaped so that as they approach their termination at the tray discharge edge they are tapered downwardly to zero height, the gradient angle of the tapered portion being such that sideways spread of material at the discharge edge 8 of a channel is compensated for by overspill from a succeeding channel. Upward extensions 10 of the portion of the tray 1 which receives the material to be spread and discharged carry pivotal attachments 11 for a counter-balanced flat-bottomed tilting receiver chute 12 whose pivot axis is at right-angles to the direction of motion of the spreader tray, and whose free end 13 can be raised or lowered to alter the angle of tilt of the chute 12 relative to the spreader tray 1. The chute 12 which is substantially the same width as the spreader tray 1 and may have spillage-preventing lips 14 along the sides parallel to the direction of motion, is provided with automatic counterbalancing means, in the form of an adjustable spring member 15 with suitable dashpot or similar motion-damping means 16 which regulate the angle of tilt of the chute 12 in accordance with the weight of materials supported thereon. Associated with the chute 12 but carried from a fixed structure (not shown) there is a hopper or spout 17 having an open mouth at its lower end arranged in such proximity to the chute surface that materials within the hopper or spout are supported thereon and can only escape therefrom through the gap 18 between the hopper mouth and the chute surface.

In operation the chute 12 reciprocates with the spreader tray 1 and assumes an angle of tilt in accordance with the supported weight determined by the input rate of feed of material into the hopper or spout 17 thus adjusting the escape gap 18 so that the output rate of feed therefrom tends to increase or decrease with the input rate of feed, the rate of change of angle of tilt being so regulated by the motion damping means 16 that short period input feed rate fluctuations are absorbed thus permitting a substantially steady stream of material to be fed from the chute 12 to form a relatively smooth layer on the spreader tray 1.

Signal means to indicate overload or cessation of input feed are provided by arranging suitable mechanical linkage, electrical switch gear, or pneumatic or hydraulic valve-gear 19 in such a way that it is caused to operate by an extension 20 of the chute 12 at points in the path of its angular motion immediately before the lower and upper limits of travel respectively. Signals so produced may be employed to start, stop, or control the speed of either the feeder or processing machinery associated therewith or combinations thereof.

FIGURES 3 and 4 show an embodiment which differs from that already described with reference to FIGURES 1 and 2 only in that the guide vanes 9 are omitted and their function is undertaken by a substantially vertical weir-plate 22, mounted along the discharge edge 8 of the tray 1, such weir-plate 22 forming a stock guide and discharge lip the top edge of which is tapered downwardly from the feed end of the discharging portion of the tray so that its height above the tray surface approaches zero towards the remote end. The said weir-plate is arranged so that the height and slope of its top edge can be adjusted relative to the tray surface by releasing a clamping bar 23. In the modification shown in FIGURE 5 the weir plate comprises a plurality of thin plates 24 adjustably clamped together by the bar 23 so that their top edges can be arranged to effect an approximation to a shallow arc.

What we claim is:

1. A vibratory spreader feeder comprising a relatively long narrow spreader tray, one end of which is a feed end and the other end of which is a discharge end, which is caused to vibrate with rectilinear motion in a direction substantially parallel to its major axis and which is asymmetrically tapered toward the discharge end to provide a discharge edge cut on a bias to the direction of the vibratory motion, longitudinal control surfaces on said spreader tray to prevent undesirable lateral spreading towards the discharge edge by materials in transit along the tray, feed means situated at the feed end of the spreader tray, said feed means incorporating a weight-operated balanced tilting feed-chute to limit the rate of feed of incoming materials fed to the spreader tray to a rate substantially equal to the average intake rate without creating local irregularities in the surface of the layer formed by said materials in passing along the tray, and a control surface comprising a vertically adjustable weir-plate mounted along said discharge edge forming a material guide and discharge lip, the top of which is tapered downwardly from the feed end of the discharge portion of the tray so that its height above the tray surface approaches zero towards the discharge end, said weir-plate comprising a plurality of thin plates each relatively movable but clamped together so that their top edges can be arranged to effect an approximation to a shallow arc.

2. A vibratory spreader feeder in accordance with claim 1, wherein the longitudinal control surfaces comprise a plurality of longitudinal vertical guide vanes mounted on the surface of the spreader tray and arranged parallel to the rectilinear motion thereof and in echelon along the discharge edge of the spreader tray so that the approach to the said discharge edge is through a plurality of comparatively narrow channels to prevent undesirable lateral spreading towards the discharge edge by materials in transit along the tray.

3. A vibrating spreader feeder in accordance with claim 2, wherein the upper edges of the longitudinal vertical guide vanes are so shaped that as they approach the discharge edge of the spreader tray they are tapered downwardly to zero height, the gradient angle of the taper being gradual so that sideways spread of material at the discharge edge of any channel is compensated for by overspill from a succeeding channel.

4. A vibratory spreader feeder in accordance with claim 1, wherein the feed regulating tilting feed-chute is pivoted at right angles to and supported above and by the spreader tray, the chute being counterbalanced by adjustable spring means regulating the angle of tilt of the chute in accordance with the weight of materials supported on it, an associated stationary feed hopper having a downwardly facing mouth which is arranged in such proximity to the chute that materials within the hopper can only escape through the gap between the hopper mouth and the chute, said hopper and chute being smooth so that materials which do not flow freely cannot build up to form permanent restrictions to the flow of material.

5. A vibrating spreader feeder in accordance with claim 1, wherein a dash pot is arranged to limit the rate of motion of the associated tilting feeder chute in either of its feed regulating directions.

References Cited in the file of this patent

UNITED STATES PATENTS

| | | |
|---|---|---|
| 590,675 | Wilfley | Sept. 28, 1897 |
| 2,626,042 | Aldridge | Jan. 20, 1953 |
| 2,850,148 | Rasmusson | Sept. 2, 1958 |
| 2,907,498 | Van Der Lely et al. | Oct. 6, 1959 |